331-98

SEARCH ROOM

July 24, 1951

H. G. MILLER 2,561,398

COAXIAL LINE CIRCUITS

Filed April 23, 1945

INVENTOR.
HORACE G. MILLER

BY Percy P. Lantzy

ATTORNEY

SEARCH ROOM

Patented July 24, 1951 2,561,398

UNITED STATES PATENT OFFICE 2,561,398

COAXIAL LINE CIRCUITS

Horace G. Miller, Belleville, N. J., assignor to Federal Telephone and Radio Corporation, New York, N. Y., a corporation of Delaware Application April 23, 1945, Serial No. 589,752

6 Claims. (Cl. 250—36)

The present invention relates to coaxial line circuits and particularly to the tuning thereof.

In certain applications of coaxial line circuits such as in amplifiers or oscillators, it is usually desirable to tune at least two circuits: two mutually isolated circuits in an amplifier and two or more mutually coupled circuits in an oscillator. In such circuits, a number of tuning methods have been used, most of which involve coaxial "short-circuiting" sliders. These sliders are often troublesome because of variable contact and because of critical adjustment. Furthermore when two of these sliders are to be ganged, mechanical difficulties often arise because the two are far apart and should move in opposite directions, and the distances which each of these two are to be moved, differ.

An object of the present invention is the provision of improved tuning means for coaxial line circuits which will overcome the foregoing difficulties.

In accordance with the present invention, tuning sliders are eliminated and replaced by fixed short circuits at one end of each line. Tuning of each line is accomplished by capacity variations at the end of the line farthest from the short, or at the maximum voltage region of each line. In one embodiment of my invention this is accomplished by a rotatable concentric ring with raised inwardly projecting capacitive faces cooperating with similar fixed outwardly projecting capacitive faces on the inner conductor.

In a coaxial line oscillator of the grounded grid type, a large degree of coupling is desired between the cathode and plate cavities. In employing the aforedescribed tuning means of my invention with such an oscillator, coupling is provided by cutting back the rings to the maximum practical depth between capacitive faces and cutting away most of the metal of the annular grid ring, leaving preferably only rather narrow fingers. The oscillator feed-back is increased by designing the fingers to have a substantial inductive reactance.

Another object of the present invention is the provision of an improved oscillator circuit of the coaxial line grounded grid type.

Other and further objects of the present invention will become apparent and the invention will be best understood from the following description of an embodiment thereof, reference being had to the drawings, in which.

Figure 1:
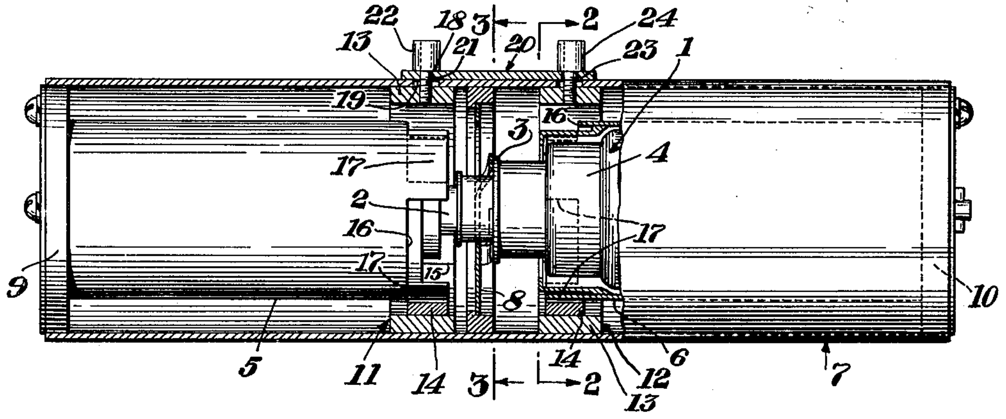
Fig. 1 is a front view, partly in elevation and partly in section, of a coaxial line circuit embodying my invention.
Figure 3:
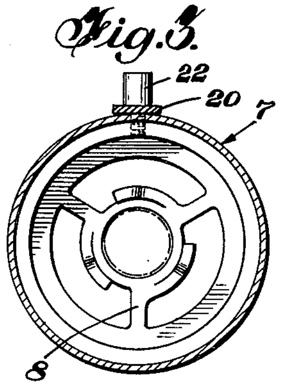
Fig. 3 is a sectional view taken along the line 3—3 of Fig. 1.
Figure 4:
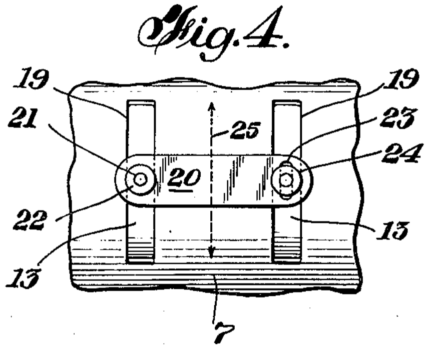
Fig 4 is a broken-away plan view showing the yoke by which the tuning means of the cathode and anode coaxial line sections are ganged.

Referring now to Fig. 1, the coaxial line circuit there illustrated is of the oscillator type and includes an electron discharge device or vacuum tube 1 preferably adapted for ultra high frequency operation such as for example, the "Lighthouse" tube. Tube 1 is provided with an anode terminal 2, grid terminal 3 and cathode terminal 4. Anode terminal 2 is connected with anode line 5 and cathode terminal 4 is connected with a cathode line 6. Lines 5 and 6 form the inner conductors of cathode and anode coaxial line sections which include an outer conductor or outer coaxial line 7 surrounding both said lines and the tube 1. The grid terminal is connected to the outer conductor 7 by fingers 8 (see Fig. 3) designed to have optimum inductive reactance so as to cause proper feed-back for sustaining the oscillations in the circuit. Oscillation is also aided by the fact that there is adequate space between the fingers 8 to allow for feed-back from the anode line to the cathode line. This differs from the construction of amplifiers in which a solid disc is used to separate the anode line from the cathode line.

Instead of using slidable tuners to tune the coaxial lines, in accordance with my invention the coaxial lines are shorted at their outer ends as indicated at 9 and 10 and capacitive means 11 and 12 are utilized adjacent the other ends, at the maximum voltage region of each of the coaxial lines, for the cathode and anode circuits respectively for tuning of said lines, the capacitive means 11 being disposed adjacent the anode terminal 2 and the capacitive means 12 being disposed adjacent the cathods terminal 4. Since both capacitive means 11 and 12 are alike, a description of one will suffice for both.

Figure 2:
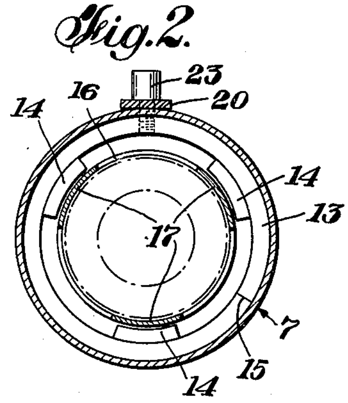
Fig. 2 is a sectional view taken along the line 2—2 of Fig. 1.

A rotatable conductive ring 13 frictionally engaging the inner wall of the outer conductor or outer line 7 is provided with a plurality of inwardly projecting capacitive faces 14 whose inner surfaces are preferably arcuate. The ring 13 is preferably split as at 15 and made of a spring-like material so that the ring 13 will bear against the inner surface of the outer line 7 and make good electrical contact therewith. The walls of line 5 are cut away as indicated at 16 so as to leave arcuate segments 17. In the position indicated in Fig. 2, the segments 17 are close to the capacitive faces 14. A short arm 18 extends through a slot 19 in the outer conductor 7 and is connected to the ring 13 and adapted to rotate said ring. By moving arm 18 the capacity between the capacitive faces 14 and the arcuate segments 17 of line 5 may be varied, thereby tuning the anode line. The tuning may be made as non-critical as desired by using only a few projecting capacitive surfaces on the ring, each covering a large angle, so that the tuning arm 18 moves through a large angle in covering the tuning frequency range. A similar arrangement is provided for the tuning of the cathode line.

In employing such capacitive tuning means in an oscillator arrangement such as indicated in which feed-back occurs at least in part through the openings in the conductor which connects the grid to the outer coaxial line, the rotatable ring 13 is cut back as much as is practically feasible between the capacitive faces so that the coupling opening between the anode coaxial line section and the cathode coaxial line section is blocked as little as possible by the metal of said ring.

In accordance with my invention I provide a simple arrangement for ganging the tuning of the cathode and anode lines. For this purpose I provide a short link or yoke 20 which has an opening 21 at one end through which the arm 18 of capacitive means 11 passes and is secured to the yoke by means of a nut 22, while at the other end of said yoke there is provided a slot 23 into which the arm 18 of capacitive means 12 passes and is fixed in position in the slot 23 by means of a nut 24. The yoke 20 is moved by some means as indicated by the dotted line 25 such as for example a screw and thread arrangement for pulling the yoke, which arrangement is adapted to be operated from the outside of the coaxial line circuit. To provide for tracking between the cathode and anode circuits, the nut 24 associated with capacitive means 12 may be loosened and the arm 18 of capacitive means 12 fixed in the desired position in the slot 23. Thus by the foregoing adjustment the cathode circuit is made to track with the anode circuit.

While I have described my invention in connection with the coaxial line oscillator, it will be seen that my invention is applicable to coaxial line amplifiers and other forms of coaxial line circuits. It will also be obvious that various details heretofore described may be varied without departing from the teachings of my invention. For example if desired the rotatable ring 13 may be insulated from the outer line 7 and only be capacitively coupled thereto instead of by direct contact. Furthermore instead of using a split ring to make frictional engagement with the inner surface of the outer conductor, a corrugated spacer of spring metal may be arranged around the ring 13 and used to provide this contact. Instead of being shorted at their outer ends by a conductor, the coaxial line sections may be capacitively effectively short-circuited at the operating frequency.

Therefore, while I have described above the principles of my invention in connection with specific apparatus, it is to be clearly understood that this description is made only by way of example and not as a limitation on the scope of my invention as defined in the accompanying claims.

I claim:

1. In a coaxial line circuit having an electron discharge device including an anode, cathode and grid, an inner cathode line coupled to said cathode, an inner anode line coupled to said anode, and an outer line coupled to said grid surrounding both the cathode line and the anode line and forming with each of said lines separate coaxial line sections, means for effectively short-circuiting each of said sections at the outer ends thereof, and separate variable capacitive means in each of said sections for tuning said sections, each of said capacitive means comprising a rotatable ring connected with one of said conductors and having a capacitive surface projecting toward the other of said conductors, a cooperating surface on said other conductor in the form of an arcuate segment, and an arm projecting through the outer conductor and connected to said ring for rotation thereof.

2. A coaxial line circuit in accordance with claim 1 wherein each of said variable capacitive tuning means is located at a maximum voltage region of its section.

3. A coaxial line circuit in accordance with claim 1 wherein said variable capacitive means in the cathode section is located adjacent the cathode and the variable capacitive means in the anode section is located adjacent the anode.

4. In a coaxial line circuit having an electron discharge device including an anode, cathode and grid, an inner cathode line coupled to said cathode, an inner anode line coupled to said anode, and an outer line coupled to said grid and forming coaxial line sections with both the anode line and the cathode line, means for effectively shorting each of the coaxial line sections at the outer ends thereof, and separate variable capacitive means for tuning each section each comprising a rotatable ring connected with one of said conductors and having a capacitive surface projecting towards the other of said conductors, a cooperating surface on said other conductor in the form of an arcuate segment, and an arm projecting through the outer conductor and connected to said ring for rotation thereof, a link coupling the arms of each of said variable capacitive means for ganging said variable capacitive means, and adjustable means associated with said link for tracking adjustment.

5. A coaxial line oscillator comprising an electron discharge device having an anode, cathode and grid, an inner cathode line coupled to said cathode, an inner anode line coupled to said anode, and an outer line forming coaxial line sections with both the anode line and the cathode line, and inductive means having a substantial reactance coupling the grid to the outer coaxial line, said inductive means having radially disposed fingers with spaces therebetween for feed-back from the anode coaxial line section to the cathode coaxial line section.

6. In a coaxial line oscillator having an electron discharge device including an anode, cathode and grid, an inner cathode line operatively coupled to said cathode, an inner anode line operatively coupled to said cathode and an outer line forming coaxial line sections with both the anode line and the cathode line, means for effectively shorting at the operating frequency the outer ends of each of said sections, variable capacitive means in each section for tuning said sections, and means extending radially from the grid to the outer line connecting the grid with said outer line, said axially-extending means having openings therein for feed-back from the anode section to the cathode section and having a substantial inductive reactance at the operating frequency.

HORACE G. MILLER.

REFERENCES CITED

The following references are of record in the file of this patent:

UNITED STATES PATENTS

| Number | Name | Date |
|---|---|---|
| 2,028,596 | Franklin | Jan. 21, 1936 |
| 2,031,490 | Kolster | Feb. 18, 1936 |
| 2,183,123 | Mason | Dec. 12, 1939 |
| 2,201,199 | Peterson | May 21, 1940 |
| 2,272,062 | George | Feb. 3, 1942 |
| 2,272,211 | Kohler | Feb. 10, 1942 |
| 2,284,405 | McArthur | May 26, 1942 |
| 2,292,880 | Koch | Aug. 11, 1942 |
| 2,301,163 | Koch | Nov. 3, 1942 |
| 2,303,388 | Pray | Dec. 1, 1942 |
| 2,337,219 | Zottu | Dec. 21, 1943 |
| 2,342,254 | Dallenbach | Feb. 22, 1944 |
| 2,416,565 | Beggs | Feb. 25, 1947 |
| 2,434,116 | McArthur | Jan. 6, 1948 |
| 2,457,194 | Anderson | Dec. 28, 1948 |